US007376401B2

(12) United States Patent
Maurer

(10) Patent No.: US 7,376,401 B2
(45) Date of Patent: May 20, 2008

(54) FREQUENCY MATCHING AND OPTIMIZATION SYSTEM FOR AN RF RECEIVER

(75) Inventor: Steven K. Maurer, Pensacola, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 468 days.

(21) Appl. No.: 11/104,945

(22) Filed: Apr. 12, 2005

(65) Prior Publication Data

US 2006/0229050 A1 Oct. 12, 2006

(51) Int. Cl.
*H04B 1/08* (2006.01)
*H04B 1/06* (2006.01)

(52) U.S. Cl. ...................... 455/130; 455/348; 455/352; 340/5.7

(58) Field of Classification Search ........ 455/418–420, 455/269–279.1, 352–354, 346–349; 340/5.7–5.73
See application file for complete search history.

(56) References Cited

U.S. PATENT DOCUMENTS 4,218,681 A 8/1980 Hormann .................... 455/603
6,016,108 A * 1/2000 Terk et al. ............. 340/825.72
6,032,209 A 2/2000 Mros et al. ................. 710/103
6,847,303 B2 1/2005 Hoermann ............. 340/825.73
6,915,146 B1 7/2005 Nguyen et al. ............. 455/702
6,978,126 B1 * 12/2005 Blaker et al. ............... 455/352
7,109,945 B2 * 9/2006 Mori .......................... 343/861
2001/0034213 A1 * 10/2001 Tsui ............................ 455/92
2005/0088281 A1 * 4/2005 Rohrberg et al. .......... 340/5.71
2006/0049914 A1 * 3/2006 Fitzgibbon ................. 340/5.23
2006/0135061 A1 * 6/2006 Ying ........................... 455/19
2006/0208855 A1 * 9/2006 Okada ....................... 340/5.72

FOREIGN PATENT DOCUMENTS

GB 2 315 892 A 2/1998
WO WO 03/077436 9/2003

* cited by examiner

*Primary Examiner*—Simon Nguyen
(74) *Attorney, Agent, or Firm*—Renner Kenner Greive Bobak Taylor & Weber

(57) ABSTRACT

A system for selectively changing the operating frequency of an RF receiver includes a receiver having a selection interface, and a frequency matching module removably attached to the barrier operator. After detecting an input on its selection interface, the receiver responsively changes its operating frequency from its current frequency to another frequency, as determined by the input. The frequency matching module then optimizes received signals of the same frequency as the receiver's operating frequency, thereby enhancing the receiver's range of signal detection.

15 Claims, 4 Drawing Sheets

FREQUENCY MATCHING AND OPTIMIZATION SYSTEM FOR AN RF RECEIVER

TECHNICAL FIELD

Generally, the present invention relates to a frequency matching and optimization system that allows a radio frequency (RF) receiver to change operating frequencies, while optimizing the received signal for processing by the receiver. More particularly, the present invention pertains to a user interchangeable frequency matching and optimization system that can be easily installed. More specifically, the present invention relates to a user interchangeable frequency matching and optimization system for a receiver used in a barrier operator, such as a garage door opener.

BACKGROUND

In general, wireless receivers and transmitters use a signal having a predetermined carrier frequency to allow the transmitter and receiver to communicate information. However, because of signal interference, the selected carrier frequency often becomes noisy, making it difficult or impossible for the receiver to accurately interpret the information transmitted within the carrier frequency. This interference may arise due to a variety of factors, including noise and other signals being in the same frequency range or band as the selected carrier signal.

One instance where interference with the transmitted carrier signal is a concern is in the operation of transmitters and receivers used with barrier operators, such as a garage door opener. Typically, when a user purchases and installs a barrier operator, he or she may determine that the receiver has a limited range of reception due to interference of the wireless transmitter's carrier signal. While this problem can be overcome by changing the operating frequency of the receiver and transmitter, it is a highly technical affair, typically requiring the physical disassembly of the barrier operator, and the replacement of the components comprising the receiver. And, of course, purchase of a new transmitter. Furthermore, most users of barrier operators do not have the required technical skill or available time to undertake such an endeavor. As a result, a technician may be required to perform the work, although an inherent risk still exists that the technician may damage the barrier operator during the completion of such work. Alternatively, the user may remove and exchange the barrier operator for another barrier operator that operates on a different carrier frequency not subject to substantial interference. However, these solutions require the user to expend substantial time, effort, and resources to achieve the optimal result.

Further, in typical circumstances, when the operating frequency of the receiver is changed, a matching network originally used with the receiver is unaltered. The receiver's matching network, or "front end" is tuned for the operating frequency of the receiver, and is responsible for efficiently capturing the RF energy of the signal sent by the remote transmitter. However, if the matching network used is not tuned for the same operating frequency as the receiver, the RF energy within the carrier signal is not optimally captured, and the receiver's ability to detect a transmitted signal at a distance, or reception range is reduced.

Therefore, there is a need for a frequency matching module, that allows a user to easily change the operating frequency of the barrier operator's receiver, without the need of a technician. Furthermore, there is a need for a plurality of frequency matching modules corresponding to a variety of carrier operating frequencies, allowing the user to select the best operating frequency for his or her barrier operator's operating environment, thereby extending the receiver's range of reception. Additionally, there is a need for a matching module that can also optimize a signal transmitted in the receiver's frequency of operation.

DISCLOSURE OF INVENTION

In light of the foregoing, it is a first aspect of the present invention to provide a frequency matching and optimization system for an RF receiver, comprising: a barrier operator having a selection interface to receive a selection input; a receiver to detect signals of any number of frequencies, the receiver configured to detect signals of a desired frequency in response to the selection input at the selection interface; and a frequency matching module having an antenna to receive signals, the matching module removably coupled to the receiver, whereby the frequency matching module optimizes signals of the desired frequency, which are detected by the receiver.

Another aspect of the present invention is achieved by a frequency matching and optimization system for a receiver comprising: a barrier operator having a receiver responsive to a carrier signal of a first frequency; a frequency matching module to optimize a received carrier signal of a second frequency, the module removably coupled to the barrier operator; and whereby in response to coupling the module to the barrier operator, the receiver becomes responsive to said second frequency.

Still another aspect of the present invention is achieved by a frequency matching and optimization system for a receiver comprising: a plurality of frequency matching modules; a receiver removably coupled to a first frequency select module, the frequency select module enabling receiver to be responsive to signals of a first predetermined frequency; wherein, the receiver is selectively enabled to be responsive to signals of a second predetermined frequency upon the removal of the first frequency select module, and the coupling of a second frequency select module to the receiver.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
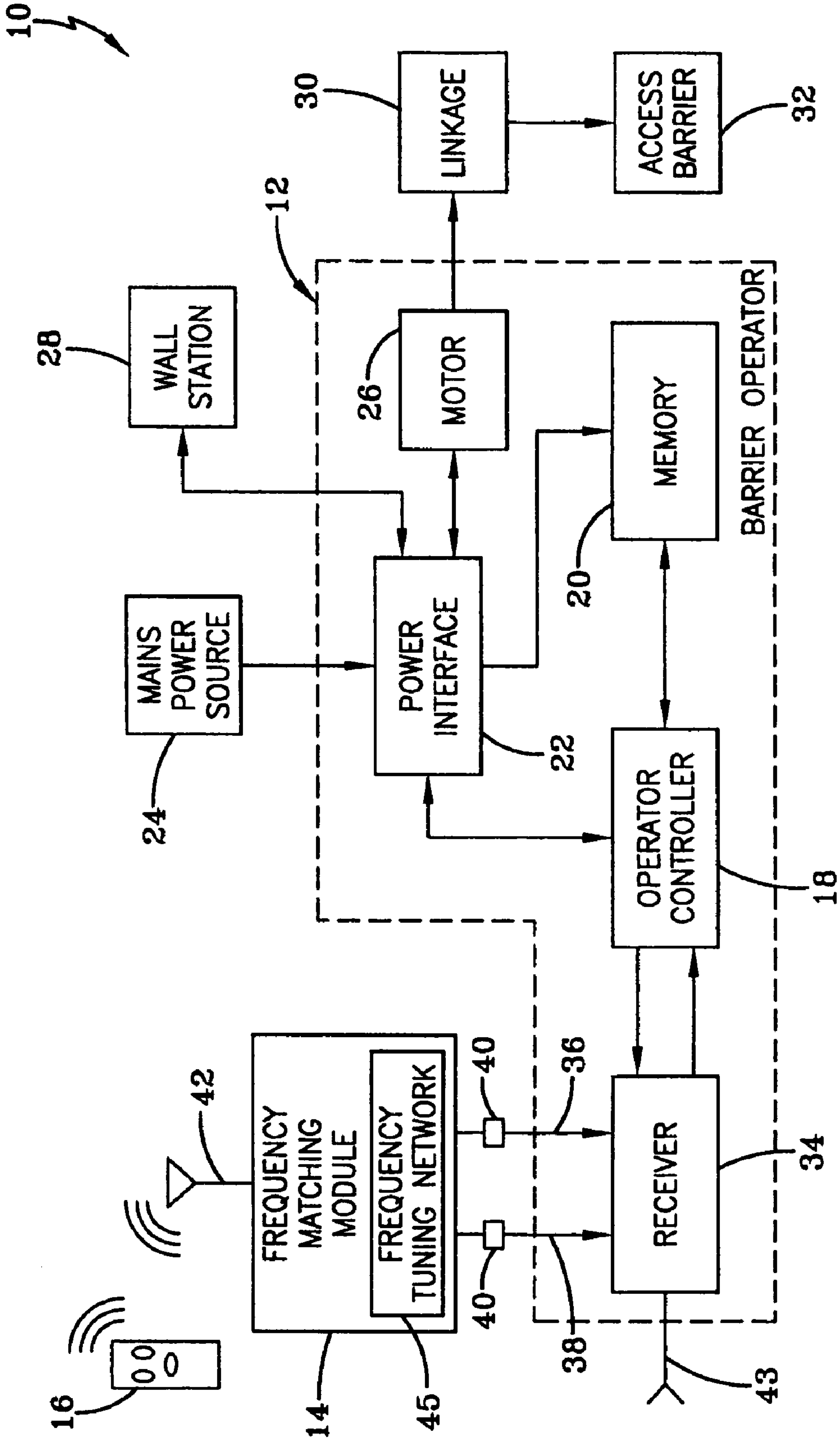
FIG. 1 is a block diagram of a barrier operator with connected frequency matching module according to the present invention.

A system for changing the operating frequency of a receiver, is generally designated by the numeral 10, as shown in FIG. 1 of the drawings. While the present system 10 can be used to change the operating frequency of a receiver used in a variety of devices, the following discussion relates to the use of the present system 10 in association with a receiver used in a barrier operator. The barrier operator, typically a garage door opener, is used to move an access barrier, such as a garage door, between open and closed positions. Of course, the system 10 could be used with other access barriers such as gates, curtains, awnings, windows and the like.

The present system 10 generally comprises a barrier operator 12, a frequency matching module 14, and a remote transmitter 16. The barrier operator 12 includes an operator controller 18 which receives input signals and generates output signals to control the various functions of the components associated with the barrier operator. Specifically, the operator controller 18 is a logic control that may be implemented using a general purpose, or application specific semiconductor based microprocessor/microcontroller that provides the necessary hardware, software, and storage to carry out the desired functions. Coupled to the operator controller 18 is a memory 20. The memory 20 allows the operator controller 18 to store and retrieve operating data as it is needed for the controller 18 to function. It is contemplated that the memory 20 may be comprised of non-volatile memory, such as EEPROM, flash memory, or ROM, or other memory of a suitable capacity to provide for the operation of the barrier operator 12. It will be appreciated that the memory may be maintained internally in the controller. Coupled to the memory 20, and to the operator controller 18, is a power interface 22. The power interface 22 assists in coordinating the various inputs and outputs of the components connected to the barrier operator 12 and the operator controller 18. Additionally, the power interface 22 receives power supplied by a mains power source 24, and transforms it into a power form, AC or DC, that is compatible for use with the components of the barrier operator 12. As used in the present discussion, mains power is defined as standard commercial or residential power, such as 120VAC for example. However, it is contemplated that the present system 10 may be easily modified, using known techniques, to operate with non-standard power. The power interface 22 also allows the barrier operator 12 to communicate with a motor 26 and a wall station 28, as well as any other sensor or device that may be contemplated. The wall station 28 is coupled to the power interface 22 via a wired connection, and allows the user to control various aspects of the barrier operator's 12 operation via the operator controller 18, such as the direction of motor shaft rotation. Although shown as a wired device, it will be appreciated that the wall station 28 may communicate with the controller 18 by wireless signals, including RF, infrared or ultrasonic. The motor 26 may comprise any type of electric motor (AC or DC) that is compatible with the power (AC or DC) being supplied by the power interface 22. Connected to the motor 26 is linkage 30, which allows the motor 26 to move an access barrier 32, such as a garage door, between open and closed positions. The linkage 30 may be comprised of a counter-balancing system used to assist in moving the barrier 32 between open and closed positions. The linkage 30 may be part of a header-mounted, trolley type, screw drive, jackshaft or any other mechanism used to assist in moving the access barrier 32 between limit positions.

A receiver 34 is connected to the barrier operator 12 and in particular to the operator controller 18. The receiver 34 is capable of receiving wireless signals, and allows the wireless transmitter 16 to send function requests to the barrier operator on a predetermined RF carrier frequency. The wireless transmissions generated by the transmitter 16 will likely be encrypted with a rolling code or related technology. The transmitted function request allows a user to control various operations of the barrier operator 12, including, for example, the opening and closing of the access barrier 32. The frequency matching module 14 is connected to the receiver 34 by a signal line 36 and a selection interface, such as a frequency select line 38. The connections between the module 14 and receiver 34 may be hardwired connections. To allow a user to easily remove or connect the frequency matching module 14 to the receiver 34, a connector or connectors 40 may be provided. The connectors 40 may be of a snap-type, pin-type, plug-type, edge connector-type or any other suitable electronics connector that would allow the frequency matching module 14 to be connected to the receiver 34. Additionally, the module 14 contains an internal antenna, such as a printed circuit board antenna (not shown), or an external antenna 42. The antenna 42 allows the matching module to receive transmitted function requests from the transmitter 16, so that such signals can be further optimized, then passed to the receiver 34, via the signal line 36, as will be discussed more fully below. It is also contemplated that any suitable internal or external antenna suitable for the present system may be used.

Furthermore, it is contemplated that the receiver 34 may include a receiver antenna 43, with the receiver 34 being sensitive to signals of an initial operating frequency. Thus, transmitted signals sent by the wireless transmitter 16 or wall station 28 on this initial frequency would be received by the receiver 34 via the receiver antenna 43. However, if the user decides to connect a matching module 14 to the receiver 34 in accordance with the discussion above, the antenna 42 of the matching module 14 is configured to override the receiver antenna 43. As a result, signals transmitted by the wireless transmitter 16 or wall station 28 are received by the antenna 42 of the matching module 14, where the signal is processed in a manner to be discussed, and passed on to the receiver 34 via the signal line 36 where it is interpreted.

Alternatively, instead of providing each receiver 34 with a receiver antenna 43, it is contemplated that the receiver 34 may be configured to utilize only the antenna 42 provided by a connected matching module 14. That is, the receiver 34, standing alone, without an attached matching module 14, would not be capable of detecting a transmitted signal. Thus, when the antenna 42 of the matching module 14 detects a transmitted signal, the signal is processed in a manner to be discussed, and is then passed on to the receiver 34 via the signal line 36 where it is interpreted.

The frequency matching module 14 comprises the necessary hardware and software, to allow the module 14 to carry out the functions to be described. Briefly, the frequency matching module 14 is configured, such that, when the matching module 14 sends a selection input, such as a control signal, via the frequency select line 38, the receiver 34 becomes sensitive to signals of a new carrier frequency. That is, the receiver's operating frequency changes to another operating frequency as determined by the matching module 14, when the module 14 sends a control signal to the receiver 34 on the frequency select line 38. It is also contemplated that the matching modules 14 will have a range of operating frequencies that each module can enable at the receiver 34. For example, one matching module 14 may enable operating frequency A at the receiver, while a second matching module 14 may enable operating frequency B at the receiver, and so on. Furthermore, each matching module 14 may allow the user to invoke a range of operating frequencies at the receiver 34, without having to replace the module 14 to enable a new operating frequency at the receiver 34. In other words, replacement of a module may allow use of a select band of frequencies or multiple bands of frequency as long as the bands are contiguous. In addition to altering the operating frequency of the receiver 34, the matching module 14 is also capable of optimizing the signals sent to the receiver 34, which will be discussed below.

During normal use, when the receiver 34 experiences reduced reception range from the transmitter 16 due to interference of the transmitted signal, the user selects a matching module 14 that enables an operating frequency at the receiver 34 that has reduced interference. Additionally, a transmitter 16 is selected that has the same operating frequency as the receiver 34, thus allowing the user to send function requests to the barrier operator 12 on the newly selected operating frequency. Once the matching module 14 has initiated a change in the receiver's 34 operating frequency, the matching module 14 performs an optimization on all incoming signals that are of the same frequency as the operating frequency of the receiver 34. Specifically, the matching module 14 takes the signal received by the internal or external antenna 42 and optimizes the transmitted signal to provide enhanced output to the receiver 34, via the signal line 36.

Figure 2:
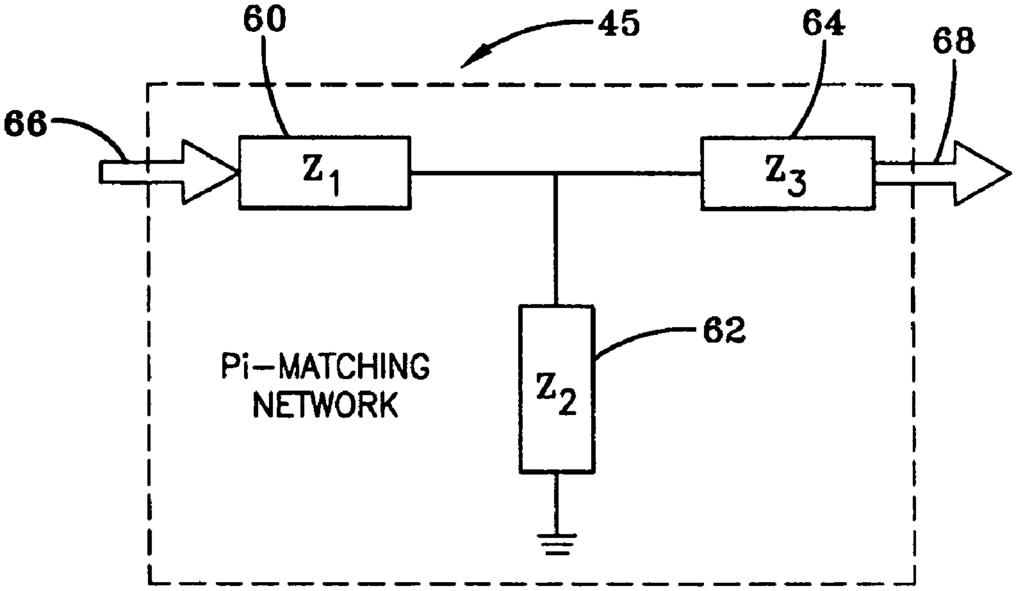
FIG. 2 is a block diagram of an alternative frequency tuning network.
Figure 3:
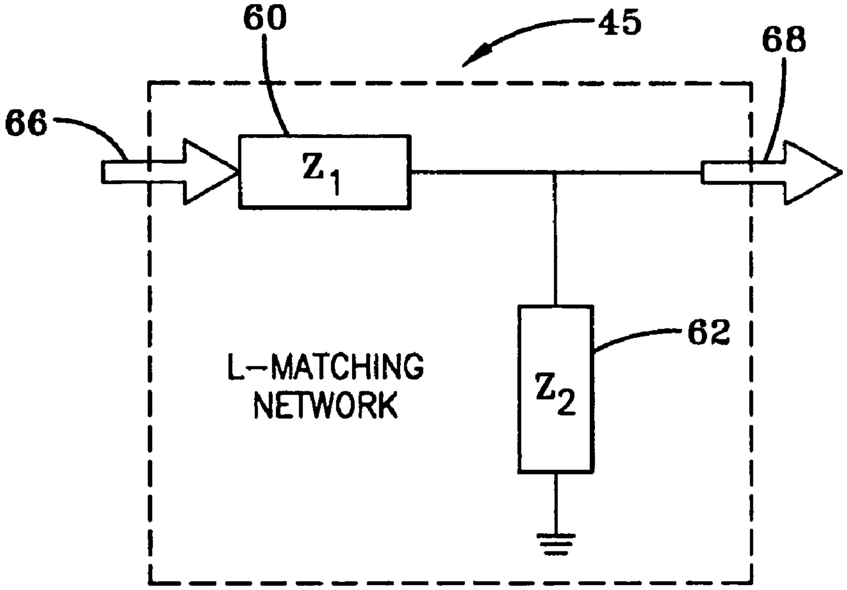
FIG. 3 is a block diagram of another alternative frequency tuning network.

Although other methods may be used to optimize the signal received by the matching module 14, one exemplary method of carrying out this optimization is by changing the effective length of the external antenna 42 (or internal antenna), based on the chosen operating frequency of the receiver 34. Yet another technique used by the matching module 14 to optimize an incoming signal may include, utilizing a frequency tuning network 45, whereby the values of the network's components comprising capacitors and inductors, are chosen based on the selected operating frequency of the receiver 34. Specifically, the tuning network 45, may comprise one or more inductors and/or one or more capacitors, and may take on a number of known tuning network topologies or designs. Two such tuning network topologies or designs are shown in FIGS. 2 and 3, which comprise a Pi-matching network and an L-network (L-matching network) respectively. The tuning network 45 shown in FIG. 2 comprises impedance elements Z1 60, Z2 62, and Z3 64 that are arranged and connected in a Pi-type configuration. A network input 66 and a network output 68 are provided, to allow signals to pass through the tuning network 45. The impedance values for these impedance elements 60-64 may comprise any suitable value, and may be realized from either inductors or capacitors or a combination of both. The frequency matching network 45 shown in FIG. 3 comprises impedance elements Z1 60, and Z2 62 that are arranged and connected in a typical L-type configuration. A network input 66 and a network output 68 are provided, to allow signals to pass through the tuning network 45. The values for these impedance elements 60, 62 may comprise any suitable value, and may be realized from either inductors or capacitors or a combination of both. As a result of these optimization techniques, the RF energy of a transmitted signal is efficiently captured, and the signal output created by the optimizing action of the matching module 14 is enhanced, allowing the receiver 34 to detect signals transmitted by the wireless transmitter 16 from a greater distance or range than the receiver 34 would be able to otherwise.

Figure 4:
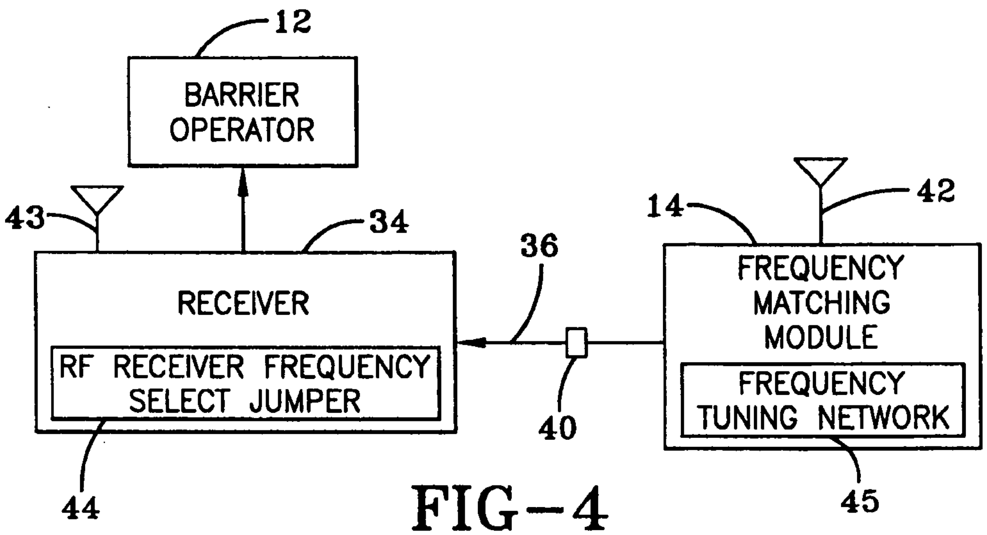
FIG. 4 is a block diagram of an alternative embodiment of the present invention where a receiver's operating frequency is changed by setting a frequency selection jumper.

FIG. 4 shows an alternative embodiment of the system 10, whereby the operating frequency of the receiver 34 is changed via a selection interface, such as a frequency selection jumper or jumpers 44 provided by the receiver 34. As used herein, the term jumper refers to a lead wire that is moveable between terminals extending from circuitry provided by the receiver. Access to this jumper 44 may be provided through an opening or window cut-out within the barrier operator 12, or the jumper 44 may be provided externally on the barrier operator 12. Other arrangements and locations for the jumper 44 are also contemplated, such that the user may easily access the jumper 44. Once the operating frequency of the receiver is changed by the new jumper selection input, such as a new jumper setting, a matching module 14 which is configured to optimize the selected operating frequency of the receiver is selected, as discussed with regard to the embodiment of FIG. 1. Once an appropriate module 14 is selected, the user then couples the module 14 to the receiver 34 via signal line 36. Furthermore, the connector 40 may be used to allow a user to easily attach and remove the matching module 14, as discussed with respect to FIG. 1. The matching module 14, because it is specifically configured for use with the receiver's operating frequency, as discussed with respect to FIG. 1 is able to receive the signal transmitted by the transmitter 16, via external antenna 42. This optimizes the received signal in a manner to provide the receiver 34 with a greater range of signal detection, than would occur otherwise. The optimized signal is then passed to the receiver 34 via the signal line 36. It should also be appreciated that the antenna 42 may also be internal to the matching module 14.

Figure 5:
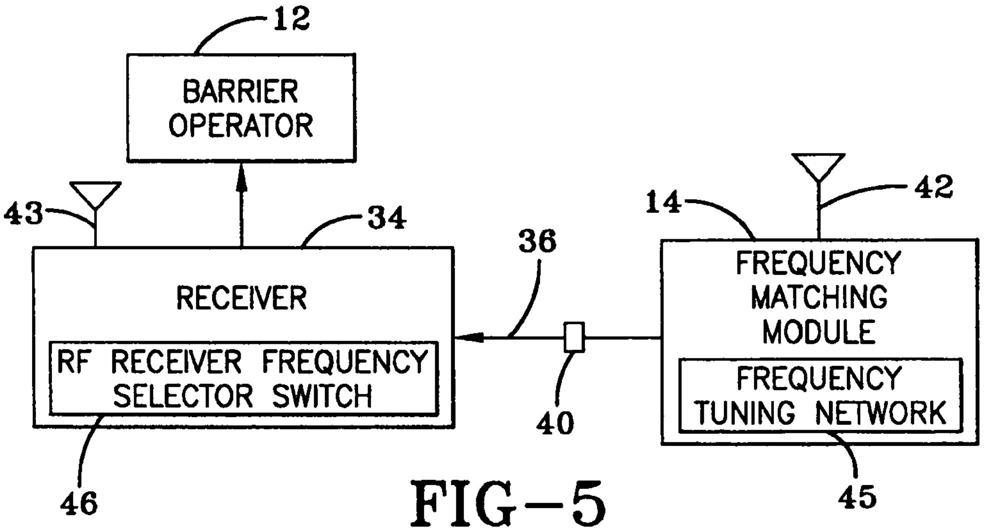
FIG. 5 is a block diagram of another embodiment of the present invention where a receiver's operating frequency is changed by a frequency select switch.

Still a further embodiment of the system 10 is shown in FIG. 5, and while functionally equivalent to the embodiment disclosed with respect to FIG. 1, the operating frequency of the receiver 34 of the present embodiment is changed through a selection interface, such as a multi-position switch 46. After the switch 46 is set to a new position, indicating a new frequency or band of frequencies, the user then selects a matching module 14 that is configured to optimize frequencies that include the selected operating frequency of the receiver, as discussed with respect to FIG. 1. The module 14 optimizes incoming signals sent by the transmitter 16 and passes the signals to the receiver via the signal line 36 for processing. As a result, the receiver 34 achieves an extended range of signal detection or reception. The antenna 42 may be external as shown, or may be internal to the matching module 14, as described with respect to FIG. 1 and 4. It is also contemplated that the frequency selection switch 46 may be comprised of a push-button type, rotary type, slide-type, or any other type of switch suitable for such application.

Figure 6:
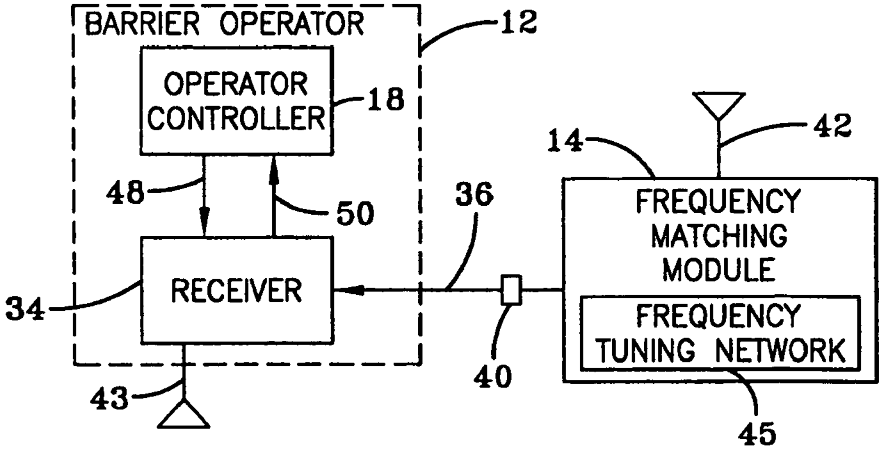
FIG. 6 is a block diagram of a further embodiment of the present invention where a receiver's operating frequency is changed by an operator controller of the barrier operator.

Yet another embodiment of the system 10 is described in FIG. 6, and while still functionally equivalent to the embodiment shown in FIG. 1, the operating frequency of the receiver 34 is changed in response to a signal sent by the operator controller 18. Here, the operator controller 18 is connected to the receiver 34 by a selection interface such as a receiver select line 48 and a receiver output line 50, that allows the receiver and operator controller to communicate. The operator controller 18 contains the necessary software or logic that, when initiated, causes the operator controller 18 to send a selection input, such as a control signal, to the receiver 34 via the receiver select line 48. As a result of the receipt of the control signal, the receiver 34 changes its initial operating frequency to another operating frequency. The initiation of the control signal can be initiated through various input mechanisms. For example, the initiation of the program may take place in a variety of manners, for example, a user may be required to depress a specific sequence of buttons on the transmitter 16 or wall station 28, which causes the operator controller 18 to send a control signal to the receiver 34 initiating a change of its operating frequency. Other methods of causing the operator controller 18 to send a control signal to the receiver 34 are contemplated, and include the operator controller 18 detecting interference with a transmitted signal, and in response dynamically sending a signal to the receiver 34 to change its frequency of operation. After the receiver's 34 frequency has been changed, the user then couples to the receiver 34, a matching module 14 configured for use with the selected operating frequency of the receiver 34, via the signal line 36. The matching module 14 receives and optimizes incoming signals sent from the transmitter 16, as discussed with the embodiment of FIG. 1. It is also contemplated that the matching module 14 may be removably attached to the receiver 34 using connectors 40, as discussed with respect to the embodiments of FIGS. 1,4, and 5.

Figure 7:
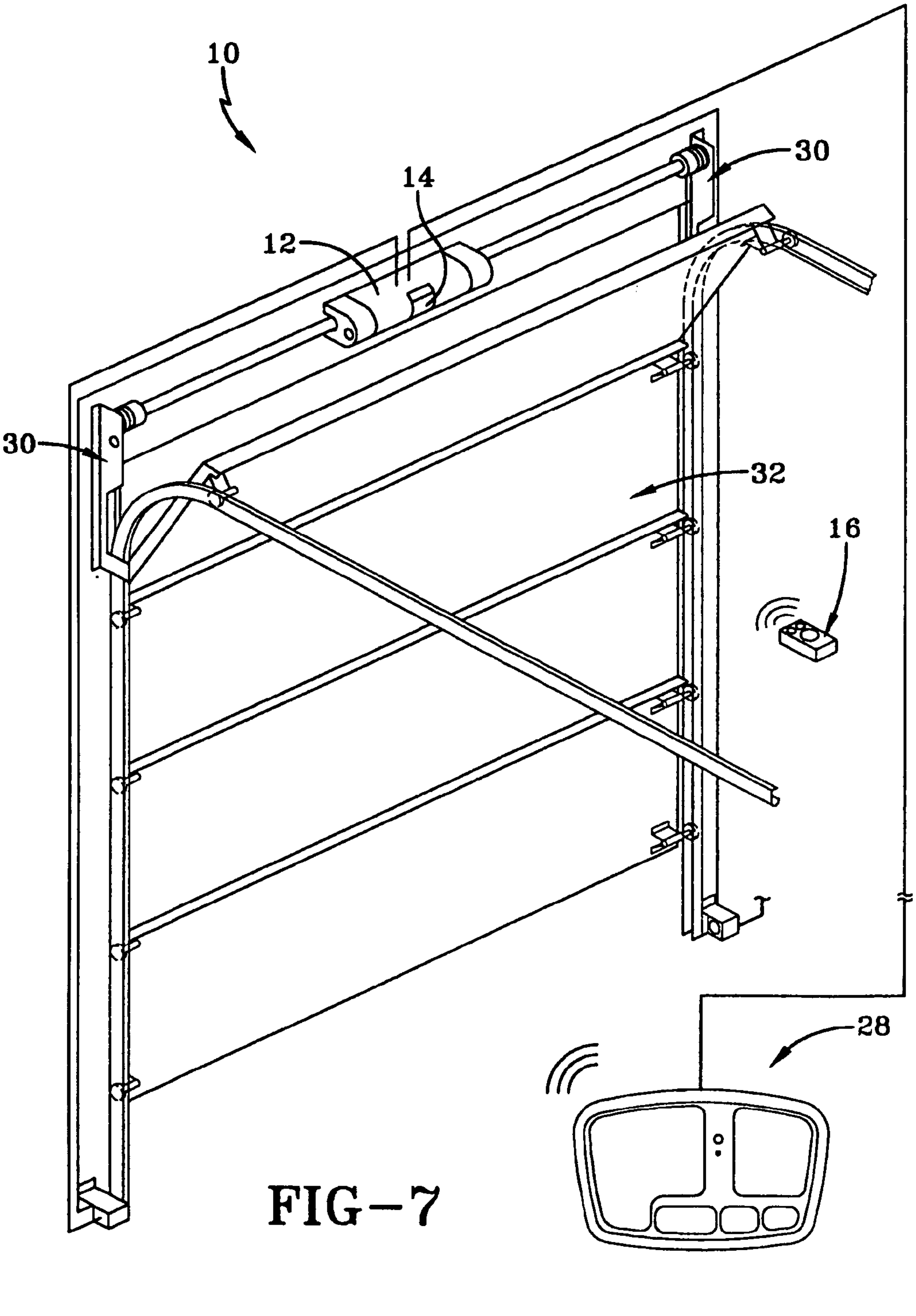
FIG. 7 is a perspective view of a mounted barrier operator with matching module and a mounted access barrier.

FIG. 7 shows the present system 10 installed in a typical configuration. Here, the barrier operator 12 is affixed to a wall or other suitable surface. Connected to the barrier operator 12, via the linkage 30, is the access barrier 32 that is a garage door in this case. The linkage 30 may comprise the systems discussed with respect to FIG. 1. Attached to the barrier operator 12 is the frequency select module 14. As discussed with respect to FIG. 1, the frequency select module 14, allows a user to change the operating frequency of the receiver 34. Thus, the user may directly access the module 14 directly without the need to disassemble the barrier operator 12.

It will, therefore, be appreciated that one advantage of one or more embodiments of the present system is that a user can easily change the operating frequency of the receiver in a barrier operator, without the expense or need of a technician. Still another advantage of the present system is that the newly selected operating frequency of the receiver can be easily optimized by selecting the appropriate matching module. Yet another advantage of the present system is that the receiver's operating frequency can be changed without resort to total replacement of the receiver itself, as a result, the cost associated with changing the frequency of the receiver is reduced. Another advantage of the present system is that the receiver's range of detection is increased by changing the operating frequency of the receiver to another frequency with reduced interference, and by optimizing the received signal.

Although the present invention has been described in considerable detail with reference to certain embodiments, other embodiments are possible. Therefore, the spirit and scope of the appended claims should not be limited to the description of the embodiments contained herein.

What is claimed is:

1. A frequency matching and optimization system for an RF receiver, comprising:

a barrier operator having:

a selection interface to receive a selection input, said selection input associated with at least two predetermined user selectable frequencies;

a receiver to detect signals of any number of frequencies, said receiver configured to detect signals of a selected predetermined frequency in response to the receipt of said selection input at said selection interface; and a frequency matching module having an antenna to receive signals, said frequency matching module removably coupled to said receiver, wherein when said frequency matching module is coupled to said receiver, said frequency matching module itself optimizes signals of said selected frequency, which are detected by said receiver.

2. The system according to claim 1, wherein said selection interface comprises a selection jumper wire.

3. The system according to claim 1, wherein said selection interface comprises a frequency selection switch.

4. The system according to claim 1, wherein said selection interface comprises an operator controller coupled to said barrier operator and a receiver select line coupling said receiver with said operator controller.

5. The system according to claim 4, wherein said selection input comprises a control signal.

6. The system according to claim 1, wherein said frequency matching module is removably coupled to said receiver by a connector.

7. The system according to claim 1, wherein said antenna is of a length suitable to optimize the RF energy contained in a transmitted signal of said desired frequency.

8. The system according to claim 7, wherein said antenna is external to said matching module.

9. The system according to claim 7, wherein said antenna is internal to said matching module.

10. The system according to claim 1, wherein said frequency matching module comprises a frequency tuning network to optimize signals of said desired frequency.

11. The system according to claim 10, wherein said frequency tuning network comprises an operatively arranged network of capacitors and inductors.

12. The system according to claim 11, wherein said operatively arranged network comprises a Pi configuration.

13. The system according to claim 11, wherein said operatively arranged network comprises an L configuration.

14. A frequency matching and optimization system for a receiver comprising:

a barrier operator having a receiver responsive to a carrier signal of a first frequency;

a frequency matching module to optimize a received carrier signal of a second frequency, said frequency matching module removably coupled to said receiver;

whereby in response to coupling said frequency matching module to said receiver, said receiver becomes responsive to said second frequency.

15. A frequency matching and optimization system for a receiver comprising:

a plurality of frequency select modules; and a first frequency matching module removably coupled to a receiver, wherein when said first frequency select module is coupled to said receiver, said receiver is enabled to be responsive to signals of a first predetermined frequency;

wherein, the receiver is selectively enabled to be responsive to signals of a second predetermined frequency upon the removal of said first frequency select module, and the coupling of a second frequency select module to said receiver.

* * * * *